Figure 1:
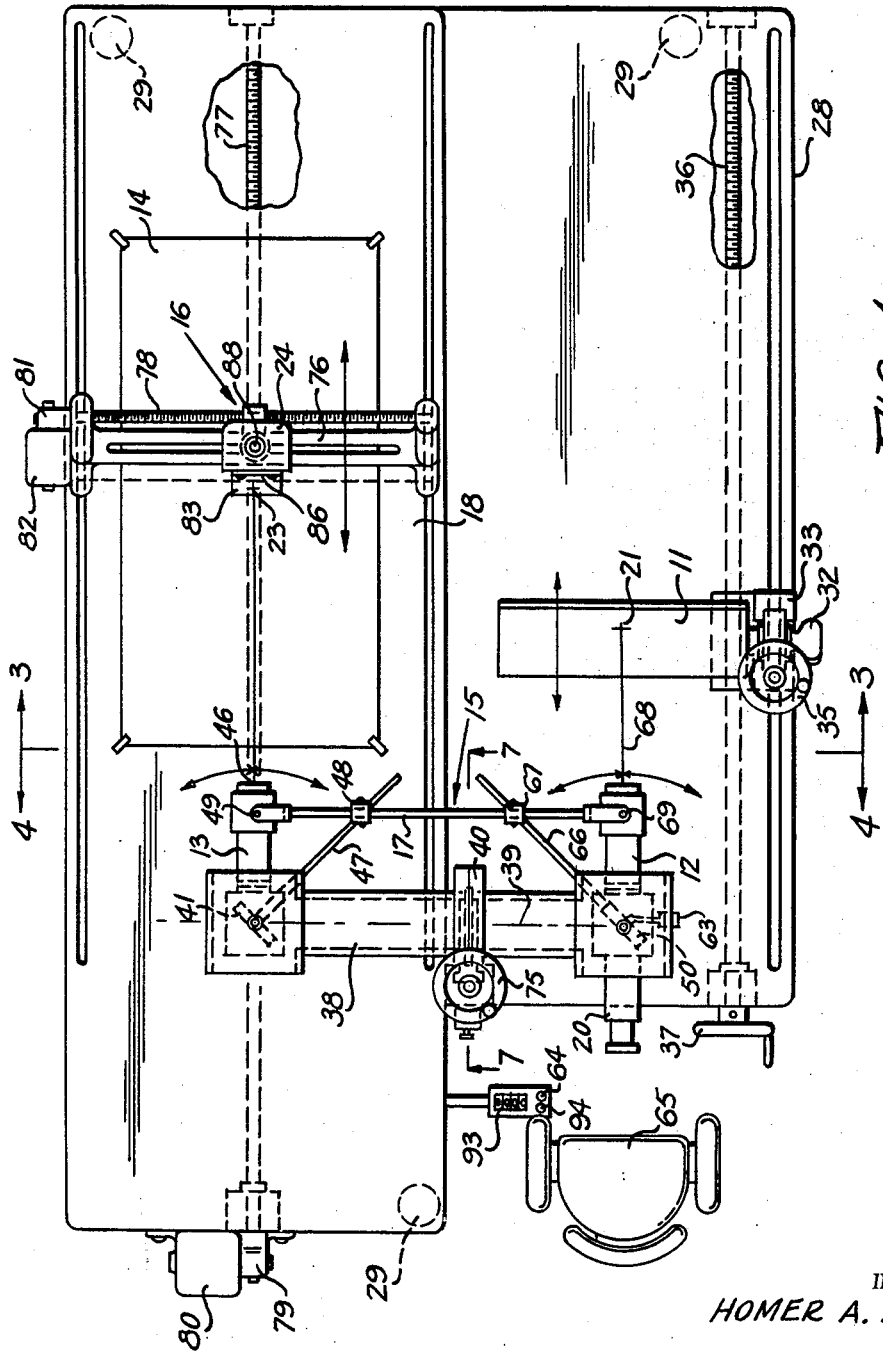

Sept. 6, 1960

H. A. RAY, JR 2,951,291

PHOTO RECTIFIER

Filed May 3, 1957

4 Sheets-Sheet 1

INVENTOR
HOMER A. RAY, Jr.

BY Walter S. Pauol.

ATTORNEY

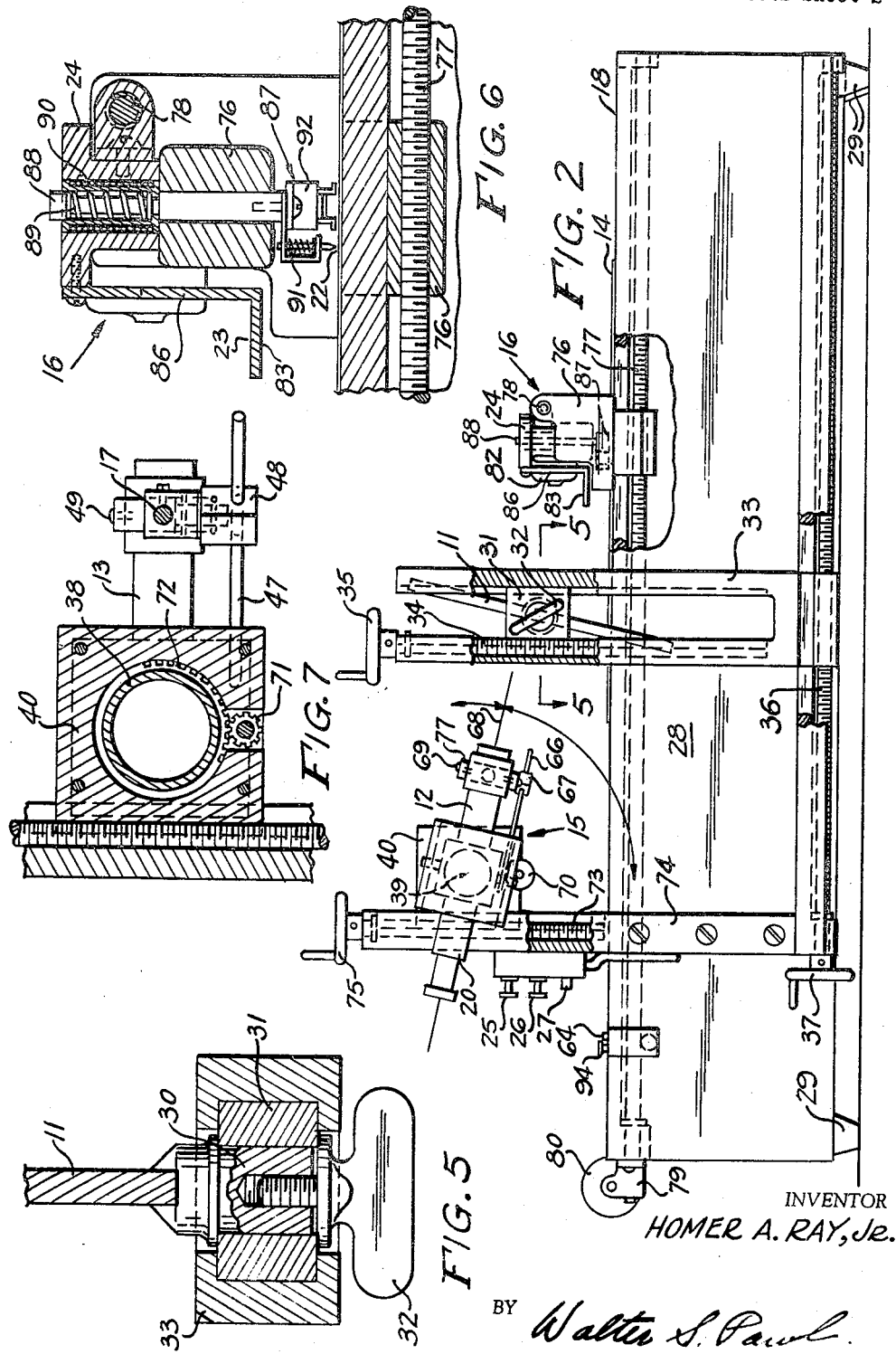

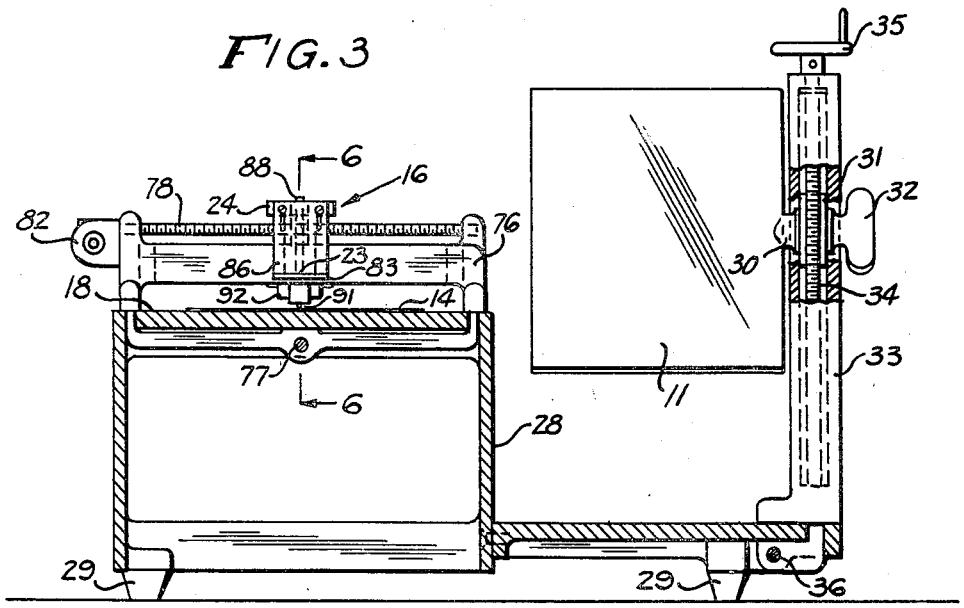

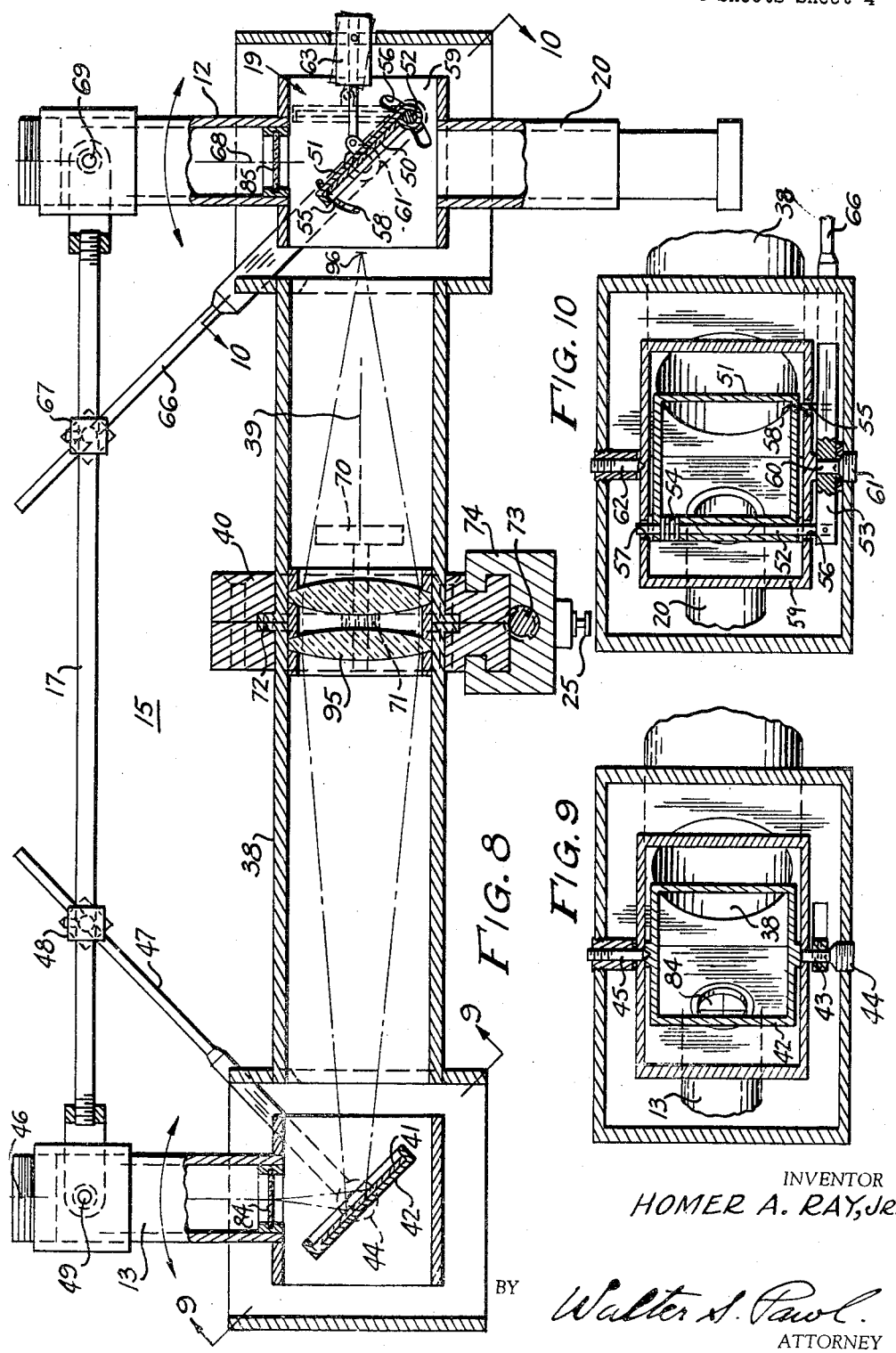

United States Patent Office 2,951,291
Patented Sept. 6, 1960

2,951,291
PHOTO RECTIFIER

Homer A. Ray, Jr., Arlington, Va., assignor to Photogrammetry, Inc., Silver Spring, Md., a corporation of Delaware Filed May 3, 1957, Ser. No. 656,869

14 Claims. (Cl. 33—1)

The present invention relates to the process and apparatus used in oblique photograph rectifiers, whereby a map or layout of objects, of which a photo was taken, at any angle and from any height, may be reproduced from the photo to any scale on the map, by direct mechanical and optical linkages between the photo and the map.

The object of this invention is to reproduce a map or sketch of objects in any substantially flat plane directly, by mechanical and optical linkages, from a photograph of said plane taken at a known angle with respect thereto.

A further object is to devise a simple apparatus including mechanical and optical linkages for carrying out the above mentioned reproduction, to any desired scale.

A further object is to provide a simple process of making a map or plot of substantially flat terrain from a photograph of said terrain taken at a known angle thereto.

A further object is to devise simple means for accurately carrying out the above process to produce a map of any desired scale.

A further object is to link a pair of telescopes, one for measuring and one for read out, by pivotally mounting each on a mutually diametral axis in a connecting tubular frame, pivotally connecting their outer ends by a link rod for parallel movement of the telescopes about their respective pivots, to mount the tubular frame horizontally for rotational adjustment about its longitudinal axis, providing cross-hair reticles at the image focus of each telescope in front of their pivotal mountings and half-angle mirrors mounted in frames for maintaining the reflecting surface at the half angle between the axis of said tubular frame and each telescope respectively for reflecting the image of the reticle in the read-out telescope to an eye-piece on the measuring telescope, the mirror at the eye-piece being movable out of the field of the eye-piece to permit viewing the reticle in the measuring telescope, to mount an oblique photograph of objects located in a substantially flat plane, in front of said measuring telescope at the same angle with respect to the horizontal at which the photograph was taken with respect to said flat plane, and at a distance from the pivotal mounting of the measuring telescope equal to the image distance of the camera lens when the photograph was taken, and to provide a horizontal plotting surface in front of the read-out telescope with a horizontally movable reticle over said surface to locate plotting points of object locations on the photograph at which the measuring telescope might be trained.

A further object is to provide control means easily accessible to the operator stationed at the eye-piece: for moving the mirror out of the field of the eye-piece to view the photograph and the reticle of the measuring telescope; for adjusting the tubular frame assembly about its axis to change the inclination of the telescopes and for swinging the telescopes sideways to enable training of the measuring telescope on any point or location on the map; for releasing the mirror to its normally biased position on its frame; for moving said plotting surface reticle so as to be able to bring its image into registry with the reticle of the read-out telescope; and for operating a point plotting and numbering or other identifying device attached to the plotting surface reticle to enable the operator to reproduce a map showing the exact relative locations of the several points directly from the photograph with the aid of the above mechanical and optical linkages.

A further object is to provide means for adjusting the elevation of the tubular frame axis over the horizontal plane of the plotting surface reticle to determine the scale of the map.

A further object is to provide vertically adjustable mounting means for the plotting surface reticle on the point plotting and identifying device to provide this elevation adjustment.

A further object is to provide vertically adjustable mounting means for the rotatably adjustable tubular frame to provide this elevation adjustment, or to supplement the range of elevation adjustment provided by the vertical adjustment of the plotting surface reticle mentioned above.

A further object is to mount all the above apparatus on a rigid base frame having three supporting feet, to prevent distortion due to any unevenness of the floor on which said apparatus might be placed.

Other and more specific objects will appear in the following detailed description of a preferred form of apparatus for performing the process of the present invention, as illustrated in the accompanying drawings, wherein:

Fig. 1 is a plan view of the apparatus, broken in parts to expose threaded portions of the adjusting means, Fig. 2 is an elevational side view thereof, broken in parts to show details of the adjusting means, Figs. 3 and 4 are sectional views in elevation taken in opposite directions on the section line in Fig. 1 as shown by the arrows 3—3 and 4—4, Fig. 5 is an enlarged sectional detail view taken on the line 5—5 of Fig. 2, Fig. 6 is an enlarged sectional detail view taken on the line 6—6 of Fig. 3, Fig. 7 is an enlarged sectional detail view taken on the line 7—7 of Fig. 1, Fig. 8 is an enlarged sectional detail view taken on the line 8—8 of Fig. 4, and Figs. 9 and 10 are sectional views taken in the planes of the two mirrors respectively as indicated by the lines 9—9 and 10—10 in Fig. 8.

In the present process of reproducing a map or layout of objects in a substantially flat plane directly from a photograph thereof taken at a known angle thereto, the accuracy of the reproduction is affected only by the accuracy and amount of play limited to the adjustment of three pivotally interconnected optical axes used in a pair of polar coordinate systems mechanically linked to directly connect corresponding points on the photograph and on the plotting surface of the map or layout being reproduced therefrom. The accuracy of the optical system is not dependent upon the half-angle tracking feature of the mirrors, as the reticles are set ahead of the selective viewing eye-piece system. A wide angle eye-piece with double image side by side could be used instead of the optical switch, whereby the mirror nearest the eye-piece is movable out of the field of the eye-piece to view the reticle in the measuring telescope.

The apparatus disclosed consists of a movable photo support 11 capable of being positioned as required by the tilt and focal length of the taking camera, a polar coordinate telescope 12 for measuring the photograph on the support 11, a polar coordinate telescope 13 for indicating points on the rectified model 14, a mechanical and optical linkage 15 for rectifying the points taken from the photograph, and a semi-automatic indicating and recording system 16 for marking the rectified points on the rectified model or map 14.

The inherent accuracy is therefore dependent upon only the three pivot axes, a connecting rod 17, and the flatness of the plotting surface 18. An optical switch 19 connects either the measuring or read-out telescope to the single eye-piece 20.

In operation, the measuring telescope is set on pertinent points 21 of the photograph, and as the instrument is adjusted thereon, the rectifying telescope 13 is constantly viewing the rectified points 22 (Fig. 6) on the plotting table 18 as represented by the reticle 23. A servo-driven reticle projector device 24 follows the rectified point with nominal accuracy and once the point to be plotted is selected, the projected reticle on the tracing table is brought into coincidence with the rectifying or read-out telescope crosshairs by X and Y motor control knobs 25 and 26, and then a button 27 is pushed to operate the point plotting and marking means on the reticle projector device 24 to mark this point and stamp a serial number or other identifying mark beside it. This number may be displayed at the operating position by a counter operated in response to the operation of the push button in unison with the marking means. Automatic servo following may be replaced with straight X and Y motor controls 25 and 26 as shown, or with similar manual controls at the operator's station comprising hand wheels mechanically connected to operate the X and Y worms.

The table flatness and slope may be surveyed-in by the rectifying telescope 13 and gauge rods. The apparatus is mounted on a rigid base frame 28 which has three feet 29 to overcome warping, and since the accuracy is dependent on the ability to make two transit type instruments on pivots, rather than utilizing rectangular coordinates with their attendant requirements for straight ways and intricate drive mechanism, the inherent accuracy shsould exceed that of all current instruments of that type.

The map support plate 11 has a bearing shaft 30 pivotally mounted in bearing block 31. Shaft 30 has a threaded bore in its end for receiving the thumb screw 32 used for clamping plate 11 to the block 31 in adjusted angular position as may be required to correspond to the angle at which the photograph was taken. The block 31 is vertically adjustable in support 33 by means of the worm shaft 34 manually operated by hand wheel 35, and support 33 is horizontally adjustable on the base frame 28 by means of worm shaft 36 and hand wheel 37. Thus the map on plate 11 may be brought to the proper distance from the axis 39 of the tubular frame 38 in front of the measuring telescope 12, the optical center of the map being positioned in line with a radial line extending from the axis 39 at the hinge point of telescope 12 normally to said plate 11. For this purpose, the plate 11 may be marked by normal center axes for orienting the photograph thereon and making it possible by adjustments of the vertical and horizontal worms 34 and 36 respectively, to position the map properly with respect to the axis 39 and the polar hinge point of the measuring telescope 12.

The tubular frame 38 is mounted horizontally for rotational adjustment in support block 40, and carries the telescopes 12 and 13 on hinges at its opposite ends, the forward ends of the telescopes being pivotally linked by yoke rod 17, as already explained, for parallel swinging movement of the telescopes in the plane of their axes.

This tubular frame assembly further includes a mirror at each end of the frame pivotally mounted on the axes of the telescope hinges. The mirror 41 at the rear of the read-out telescope 13 has a frame 42 rigidly mounted on a hinge pin 43 and pivotally supported between pivot bearing 44 and hinge pin 45 to maintain the mirror in a half-angle position between the axis 39 of the tubular frame 38 and the axis 46 of the telescope 13, as shown, by means of the control rod 47, which is rigidly connected to pin 43 and is slidably mounted in a block 48 pivotally supported on rod 17 at a point spaced from the axis 46 a distance equal to the spacing between the pin 43 and the yoke rod pivots 49. The telescope 13 is hinged on the hinge pins 43 and 45.

The mirror 50 at the rear of the measuring telescope 12 has a frame 51 hingedly mounted on pin 52 at one end of a bar 53 and is biased by spring 54 into normal operative position against stop pin 55 on bar 53. The pins are passed through arcuate slots 56, 57 and 58 in the telescope casing 59 to permit relative movement therebetween. Bar 53 is bored for pivotal mounting on hinge pin 60, which is rigidly fixed to the telescope casing 59. The telescope 12 is hinged between pivot bearing 61 and hinge pin 62.

The mirror frame 51 is swung to inoperative position by solenoid 63 hinged between the back of the mirror frame and the tubular frame 38. The solenoid may be energized by a control switch such as 64 conveniently located near the operator sitting in a chair 65 at the operating station.

Bar 53 is extended to form the control rod 66 which is slidably mounted in a block 67 pivotally supported on rod 17 at a point spaced from the axis 68 of telescope 12 a distance equal to the spacing between the hinge pin 60 and the yoke rod pivots 69.

The tubular frame assembly may be rotatably adjusted about the axis 39 by means of a control knob 70 fixed on the shaft of a pinion 71, which is meshed with the external ring gear 72 on the tubular frame 38 in the block 40.

The support block 40 may be made vertically adjustable, as already mentioned. One way of providing this adjustment is to use a vertical worm 73 in the supporting standard 74 and operated by the hand wheel 75 at the top.

The semi-automatic indicating and recording system 16 comprises an axially movable carriage 76 extending laterally across the table, having a reticle projector device 24 movable over the table on said carriage. An axially extending worm 77 under the table is connected to a yoke attached to the carriage 76 for moving it axially, and a transversely extending worm 78 on said carriage is connected to the device 24 for moving it transversely. Worm 77 may be driven in either direction through a worm and gear drive 79 by reversible motor 80, and worm 78 may be driven through worm and gear drive 81 by reversible motor 82. Thus, an X and Y coordinate adjustment means is provided for the reticle projector device over the table 18, controlled from the operator's station by knobs 25 and 26 to bring the horizontal reticle 23 into registration with the reticle 84 in telescope 13, after the reticle 85 in telescope 12 has been brought over a desired point 21 on the photo to be rectified.

The reticle projector device has a vertically adjustable reticle bracket 86 for the horizontal shelf 83 on which the reticle 23 is inscribed. It also carries a vertically operated point marker and identification stamp unit 87 mounted at the bottom of a solenoid armature 88, which is normally biased into its upward or inoperative position by spring 89 and may be actuated downwardly by energizing the solenoid coil 90 to operate the point marker and identification stamp unit 87. This unit includes the pointed marker 91 and identification stamp 92, which may be a consecutive number stamping machine synchronized with a counter 93 on the control panel, which is automatically controlled to advance each time the marker and stamp unit is operated by pressing the push button 27 to mark and identify the point on the photo that is being registered on the map. Counter 93 may have a manual reset knob 94.

The optical linkage between the mirrors 41 and 50 includes a lens assembly 95 for focusing the image of the reticle 84 at a point 96 short of reaching the mirror 50 by the distance that the reticle 85 is in back of mirror 50 when in its operative position, so that the eye-piece 20, when adjusted to bring the reticle 85 into focus when viewing the photo, will not have to be readjusted to bring the reticle 84 into focus each time the mirror 50 is released for observation of the position of reticle 23 with respect to reticle 84. Telescope 13 may be provided with auto-focusing means (not shown) responsive to the change in object distance due to the change in angular relation of the telescope to the horizontal. Alternatively, manual or motor operated means may be provided for focusing, and controlled by suitable means, within reach of the operator at his operating station.

It will be observed that the scale of the map will be determined by the elevation of the axis 39 above the horizontal plane of the reticle 23, as compared with the actual elevation or distance of the camera image from the plane which was photographed, and the photograph of which is now being rectified into a map or layout of the plane. Minor variations in ground elevations may be disregarded in rectification of air photos taken at great heights, without seriously affecting the accuracy of the reproduced map. However, when variations in ground elevations or in elevations of points in the photo to be plotted are significant, as in mountainous or hilly country, or in cities with tall building structures, the reticle 23 may be correspondingly adjusted up or down to obtain accurate rectification of such points on the map.

Many obvious modifications in the detail forms and arrangements of parts may be made without departing from the spirit and scope of this invention, as defined in the appended claims.

What is claimed is:

1. In an instrument for rectifying a photograph of a plot of objects taken at a known oblique angle thereto and at a known perpendicular distance therefrom with a camera of known focal distance, an optical and mechanical linkage comprising a horizontally supported hollow frame, rotatably adjustable about its horizontal axis, a pair of telescopes hinged at their rear ends on parallel transverse hinges spaced on said horizontal axis for rotatable movement with said hollow frame, a link pivoted to the front ends of said telescopes, to maintain them in parallel relation upon angular swinging adjustment about their respective hinges, an adjustable support for positioning said photograph in front of said one telescope at a distance from said horizontal axis equal to the focal distance of said camera and at said known angle, and a horizontal surface for the rectified model of said plot in front of said other telescope with plotting means movable thereon for lining up with the line of sight of said other telescope and plotting on said rectified model each pertinent point on the photograph as the first telescope is trained on it.

2. A polar coordinate optical linkage comprising a rotatably adjustable hollow support, a pair of sighting telescopes, parallel hinges pivotably mounting said sighting telescopes at spaced points on said support, the hinge axes being parallel to each other, transverse to the axis of rotation of said hollow support and transverse to the line of sight of said sighting telescopes, and a link rod pivoted between the front ends of said telescopes for simultaneous parallel swinging adjustment of said telescopes about their respective hinges, a reticle screen for receiving the image in each telescope ahead of the respective hinge, said hinges providing open spaces along the line of sight through said telescopes, an eye piece on one of said telescopes coaxial therewith and extending back of the corresponding hinge, pivoted mirrors mounted at each hinge at half angle positions for reflecting light through said hollow support between said telescopes from the reticle of the spaced telescope to said eyepiece, and means for maintaining the angular positions of said mirrors in accordance with the angular adjustment of said telescopes about their respective hinges.

3. An optical linkage as defined in claim 2, one of said mirrors mounted in front of said eyepiece and located between one reticle screen and said eyepiece, and means for swinging said mirror in front of said eyepiece out of the view of its telescope for viewing its reticle screen directly through said eye-piece.

4. An optical linkage as defined in claim 3, and a lens system in said hollow support for focusing the image of the reflection of the reticle screen of said spaced telescope at a point in front of the hinge of the telescope with the eye-piece, a distance equal to the spacing of its reticle screen ahead of said hinge, whereby the eye-piece does not have to be readjusted independently for focusing either reticle screen into sharp focus in successive sighting through one telescope and through the other by correspondingly operating said mirror swinging means.

5. A polar coordinate optical linkage comprising a rotatably adjustable support, a pair of sighting instruments hinged on transverse parallel hinges, spaced on the axis of rotation of said support, a link rod pivoted between the ends of said instruments for simultaneous parallel swinging adjustment of said instruments about their respective hinges, a reticle screen for receiving the image in each instrument ahead of the respective hinge, said hinges providing open space along the line of sight through said instruments, an eyepiece on one of said instruments, pivoted mirrors mounted at each hinge at half-angle positions for reflecting light through said hollow support between said instruments from said reticle screen of the spaced instrument to said eyepiece, means for maintaining the angular positions of said mirrors in accordance with the angular adjustment of said instruments about their respective hinges, one of said mirrors mounted in front of said eye-piece and located between one reticle screen and said eyepiece, means for swinging said mirror in front of said eyepiece out of the view of its instrument for viewing its reticle screen directly through said eyepiece, a lens system in said support for focusing the image of the reflection of the reticle screen of said spaced instrument at a point in front of the hinge of the instrument with the eyepiece a distance equal to the spacing of its reticle screen ahead of said hinge, whereby the eyepiece does not have to be readjusted independently for focusing either reticle screen into sharp focus in successive sighting through one instrument and through the other by correspondingly operating said mirror swinging means, a support plate adapted for holding a photograph, an adjustable support for said plate in front of said eye-piece instrument, a table below and in front of said other instrument adaptable for receiving a plotting sheet, a horizontally adjustable reticle over said table and a carriage for said reticle having point plotting means for recording positions of said reticle in its horizontal adjustment on said plotting sheet.

6. The combination defined in claim 5, a photograph of a plot of objects taken by a camera of known focal distance at a known oblique angle to said plot and at a known perpendicular distance therefrom, mounted on said plate, said adjustable support being adapted to adjust said photograph to a position in front of the hinge of said eyepiece instrument at said known focal distance and said known angle.

7. The combination defined in claim 6, a control panel within reach of an operator from the observer's station at the eye-piece, including controls for coordinate adjustment of said carriage over said table.

8. The combination of claim 7, a bracket support on said carriage, a bracket for said table reticle vertically adjustable in said bracket support to adjust the distance of the horizontal reticle plane from the axis of said rotatable support proportionately in accordance with the elevation of the corresponding point on said plot.

9. The combination of claim 8, said plotting means including a solenoid with a vertical armature on said carriage, an identification and point plotting stamp at the lower end of said armature, normally resiliently raised off said table, and a control switch on said control panel for energizing said solenoid to operate said stamp.

10. The combination of claim 9, said stamp including a consecutive numbering machine for stamping the identifying number for the point plotted.

11. The combination of claim 10, and a counter at the observer's station with a control switch for simultaneously operating said stamp and advancing said counter.

12. The combination of claim 11, and a reset knob on said counter for synchronizing it with said numbering machine.

13. The combination of claim 12, said rotatable support having a peripheral external ring gear, a bearing block for said rotatable support, a pinion gear mounted in said block and meshing with said ring gear.

14. The combination of claim 13, a control knob on said pinion gear extending from said block within reach of the observer for rotatably adjusting said instrument support.

References Cited in the file of this patent
UNITED STATES PATENTS

| | | |
|---|---|---|
| 398,865 | Wade | Mar. 5, 1889 |
| 798,931 | Staal et al. | Sept. 5, 1905 |
| 1,504,384 | Schneider | Aug. 12, 1924 |
| 2,338,729 | McQuaid | Jan. 11, 1944 |
| 2,578,013 | Monk | Dec. 11, 1951 |
| 2,625,854 | Hayward | Jan. 20, 1953 |
| 2,637,619 | Stein | May 5, 1953 |

FOREIGN PATENTS

| | | |
|---|---|---|
| 869,437 | France | Nov. 7, 1941 |
| 711,809 | Great Britain | July 14, 1954 |